Feb. 1, 1927.
A. LINCICOME
1,615,949
AUTOMOBILE TRAFFIC SIGNAL
Filed May 8, 1925
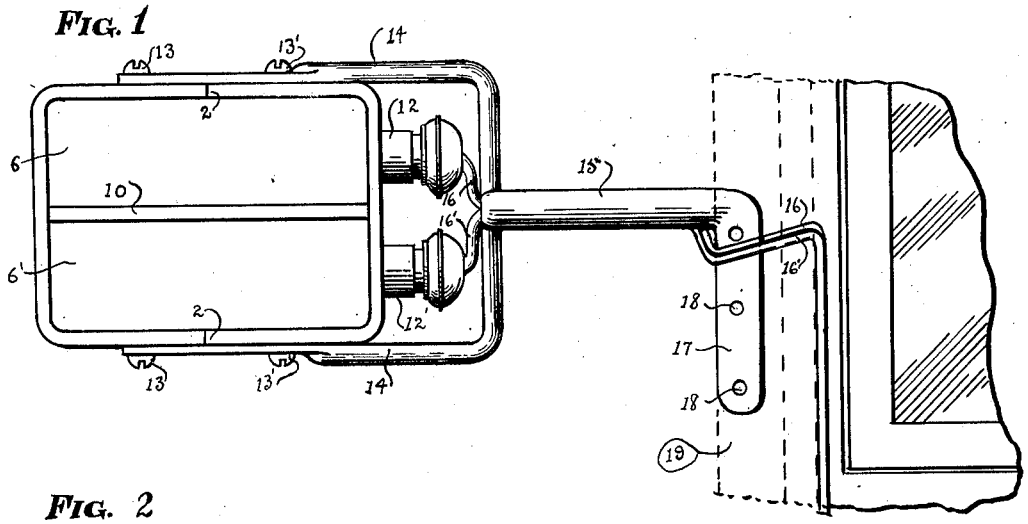
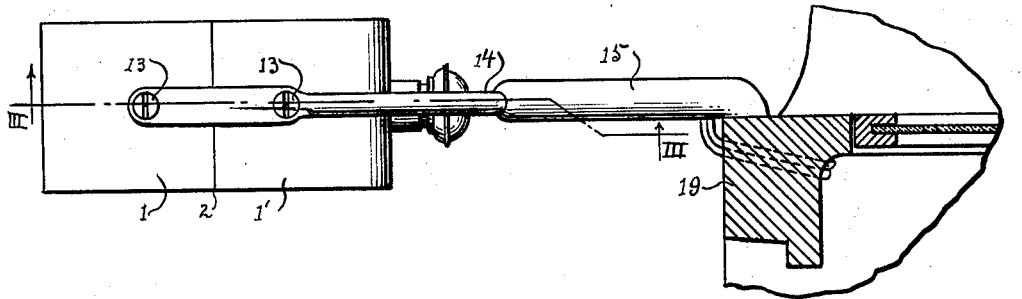
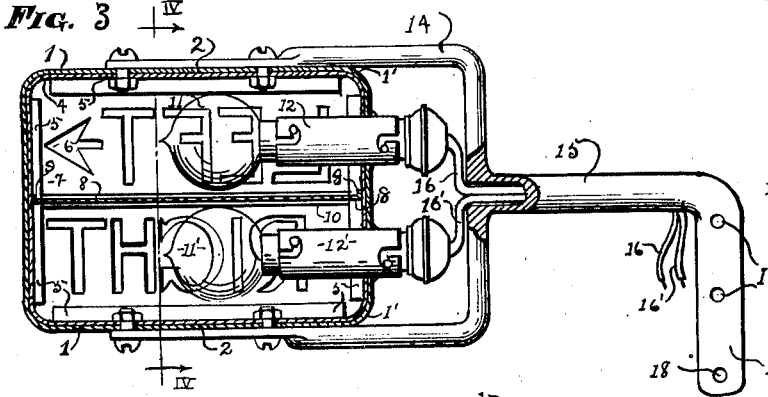
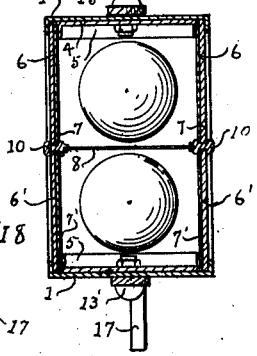
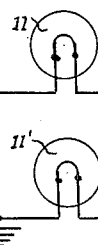
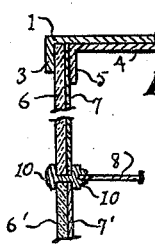
INVENTOR.
Asbury Lincicome
BY
*William C. Edwards Jr.*
ATTORNEY.

Patented Feb. 1, 1927.

1,615,949

UNITED STATES PATENT OFFICE.

ASBURY LINCICOME, OF WICHITA, KANSAS.

AUTOMOBILE TRAFFIC SIGNAL.

Application filed May 8, 1925. Serial No. 28,780.

This invention relates to an improved electric signal device such as may be installed upon the windshield or a corner post of an enclosed automobile and by signal means indicate traffic changes to enable a following automobile driver to know immediately the intent of the driver to change his direction, and thereby avert accidents and for the other purposes of traffic signals. A fuller understanding of the invention will be disclosed in the description of the accompanying drawings, in which Fig. 1 is the rear face view of the device, or that face that would be apparent to the driver of the following automobile; Fig. 2 is a top view of Fig. 1 with a part in section to show the electric wires leading to switch mechanism, not shown, but available to the automobile driver; Fig. 3 is a sectional view taken on the line III—III, Fig. 2, looking in the direction of the arrows; Fig. 4 is a sectional view taken along the line IV—IV, Fig. 3, looking in the direction of the arrows; Fig. 5 is an enlarged detail view of the assembly of the case, which will be later explained; and Fig. 6 is a wiring diagram of the electric system employed. Similar numerals of reference indicate corresponding parts throughout all the figures of the drawings.

Referring to the drawings, the case is constructed of two U-shaped sections 1 and 1′, Fig. 2. These parts abut each other as shown at ends 2, Fig. 1. The edges of said members 1 and 1′ are turned down as seen at 3, Fig. 5. An inner case 4 is made of one piece with its edges turned down as seen at 5 thereby providing peripheral channels intermediate the edges 3 of the outer sections and the edges 5 of the case 4. This space receives a glass 6 and stencil 7. An intermediate horizontal division plate 8 is soldered or made rigid to the case 4 at 9, Fig. 3 to form an upper and a lower compartment for the signals. The side edges of the plate 8 enter channel members 10.

These channel members 10, Fig. 1 also receive glasses 6 and stencils 7; and glasses 6′ and the stencils 7′. In the two compartments are the usual electric lights 11 and 11′, sockets 12 and 12′. Thus the signals may be read from the front or rear of the automobile.

The glasses 6 and 6′ may be colored as desired; thus 6 may be red while 6′ may be blue or green. The sections 1 and 1′ are held together by screw means 13, 13′ which pass through the arms of a U-shaped supporting standard 14. The standard 14 is carried by a hollow arm 15, through which pass the electric wires 16, 16′. The inner end of the arm 15 is flattened at 17, and is provided with screw holes 18, through which screws pass and hold the signal device on the corner post 19 of the automobile. The arm 15 may be provided with a suitable clamp to fasten on a windshield of an open automobile, in which case the member 17 would be omitted.

Such modifications may be employed as lie within the scope of the appended claim.

Having fully described my invention, what I now claim as new and desire to secure by Letters Patent is:

In an automobile traffic signal, two outer U-shaped members reversed in position with their ends in contact, a forked bracket attached to and supporting the sides of said members, an inner case as a band contiguous the inner face of the outer members and a horizontal plate within and rigid to said case and dividing the device into an upper and a lower compartment; peripheral channels formed by bent edges of the U-shaped members and bent edges of the inner case; channel members receiving the sides of the division plate; and glass and signal indicators as face members of the device supported within said channel members and said peripheral channels.

ASBURY LINCICOME.